US012485096B2

(12) United States Patent
Zou et al.

(10) Patent No.: US 12,485,096 B2
(45) Date of Patent: Dec. 2, 2025

(54) CURCUMIN COMPLEX, PREPARATION METHOD THEREFOR AND DETECTION METHOD THEREFOR

(71) Applicants: CHENLAND NUTRITIONALS, INC., Pomona, CA (US); QINGDAO CHENLAND BIOLOGICAL TECHNOLOGY CO., LTD., Shandong (CN)

(72) Inventors: Shengcan Zou, Shandong (CN); Min Han, Shandong (CN); Jiancheng Zong, Shandong (CN); Lei Zong, Shandong (CN); Shanglong Wang, Shandong (CN); Xin Li, Shandong (CN)

(73) Assignees: CHENLAND NUTRITIONALS, INC., Pomona, CA (US); QINGDAO CHENLAND HEALTH INDUSTRY GROUP CO., LTD., Shandong (CN)

( * ) Notice: Subject to any disclaimer, the term of this patent is extended or adjusted under 35 U.S.C. 154(b) by 967 days.

(21) Appl. No.: 17/634,580

(22) PCT Filed: Dec. 25, 2020

(86) PCT No.: PCT/CN2020/139359
§ 371 (c)(1),
(2) Date: Feb. 11, 2022

(87) PCT Pub. No.: WO2021/143485
PCT Pub. Date: Jul. 22, 2021

(65) Prior Publication Data
US 2022/0280431 A1 Sep. 8, 2022

(30) Foreign Application Priority Data
Jan. 17, 2020 (CN) .......................... 202010055763.1

(51) Int. Cl.
*A61K 9/14* (2006.01)
*A61K 31/12* (2006.01)
*G01N 30/02* (2006.01)
*G01N 30/06* (2006.01)

(52) U.S. Cl.
CPC .............. *A61K 9/145* (2013.01); *A61K 9/146* (2013.01); *A61K 9/148* (2013.01); *A61K 31/12* (2013.01); *G01N 30/06* (2013.01); *G01N 2030/027* (2013.01)

(58) Field of Classification Search
CPC ........ A61K 9/145; A61K 9/146; A61K 9/148; A61K 31/12; G01N 30/06
See application file for complete search history.

(56) References Cited

U.S. PATENT DOCUMENTS

| 2012/0160944 A1 | 6/2012 | Dodd et al. |
| 2012/0165323 A1 | 6/2012 | Dodd et al. |
| 2012/0165410 A1 | 6/2012 | Dodd et al. |
| 2012/0202694 A1 | 8/2012 | Dodd et al. |

FOREIGN PATENT DOCUMENTS

| CN | 101433514 | * | 5/2009 | ............... A61K 9/00 |
| CN | 101433514 A | | 5/2009 | |
| CN | 102188365 A | | 9/2011 | |
| CN | 102626384 A | | 8/2012 | |
| CN | 104188909 A | | 12/2014 | |
| CN | 104825396 | * | 8/2015 | ............. A01N 25/12 |
| CN | 104825396 A | | 8/2015 | |
| CN | 105663045 A | | 6/2016 | |
| CN | 106137972 | * | 11/2016 | ................ A61P 9/10 |
| CN | 106137972 A | | 11/2016 | |
| CN | 106390948 | * | 2/2017 | ............. B01J 20/26 |
| CN | 106390948 A | | 2/2017 | |
| CN | 107049957 A | | 8/2017 | |
| CN | 107308133 | * | 11/2017 | ............... A61K 9/51 |
| CN | 107308133 A | | 11/2017 | |
| WO | 2017138022 A1 | | 8/2017 | |
| WO | WO 2017/138022 | * | 8/2017 | ............. A61K 45/06 |

OTHER PUBLICATIONS

International Search Report for PCT/CN2020/139359 mailed Mar. 24, 2021, ISA/CN.

* cited by examiner

*Primary Examiner* — Erich A Leeser
(74) *Attorney, Agent, or Firm* — Yue (Robert) Xu; Apex Attorneys at Law, LLP

(57) ABSTRACT

A curcumin complex, a preparation method therefor and a detection method therefor, the curcumin complex comprising a solid complex formed by grinding auxiliary material and curcumin, the auxiliary material comprising Soluplus, poloxamer 407, or poloxamer 188; when the auxiliary material comprises the Soluplus, the mass ratio of the curcumin to the Soluplus is 1:8-10; and when the auxiliary material comprises the poloxamer 407 or poloxamer 188, the mass ratio of the curcumin to the poloxamer 407 is 1:0.4-0.6, and the mass ratio of the curcumin to the poloxamer 188 is 1:0.4-0.6. Also disclosed is a preparation method for a curcumin complex. The curcumin complex has high bioavailability and a simple prescription process; in addition, the crystal form of the curcumin is not changed, and not only is quality control more complete and reliable, but costs are also lower, and large-scale production is facilitated.

10 Claims, 7 Drawing Sheets

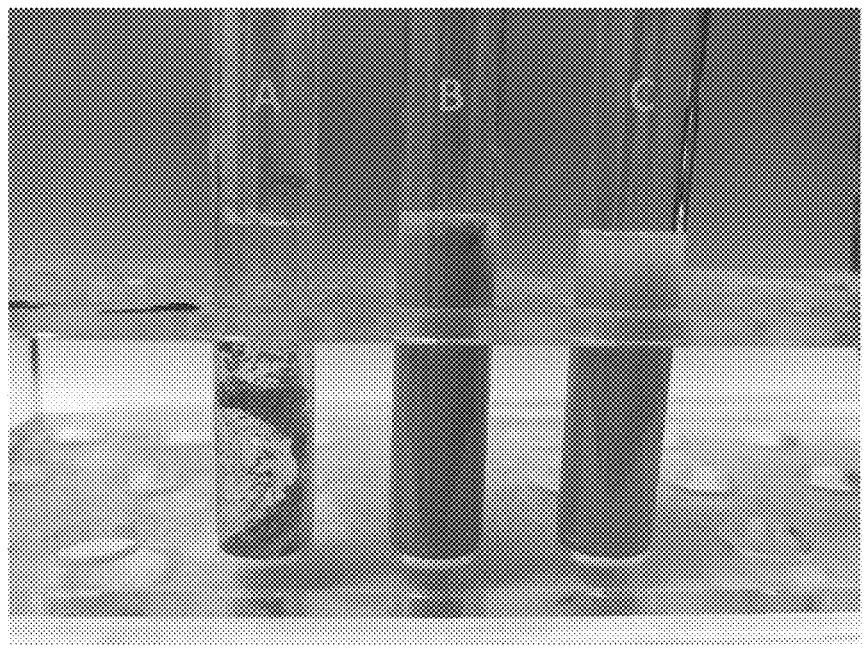
FIG. 1
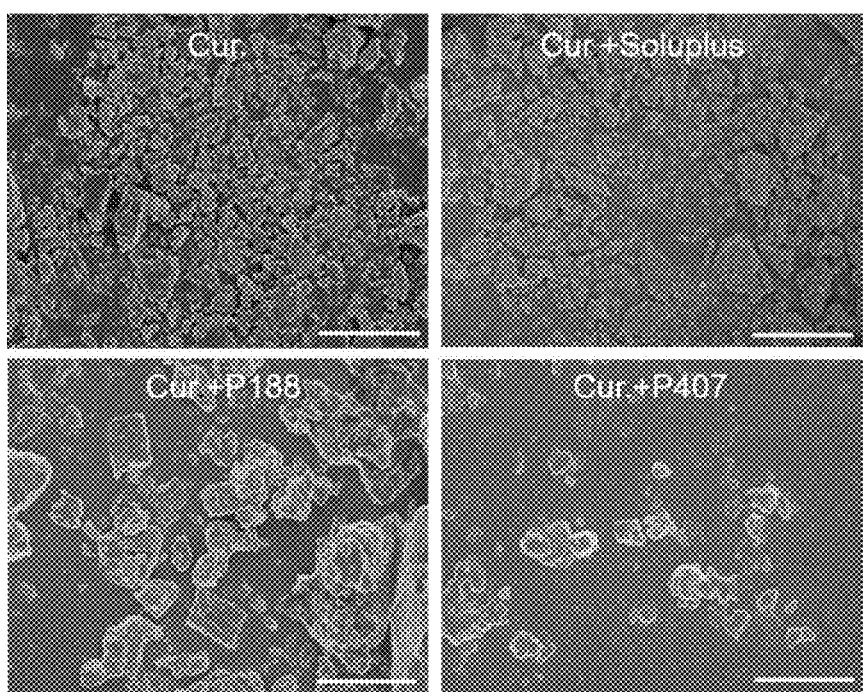
FIG. 2.1

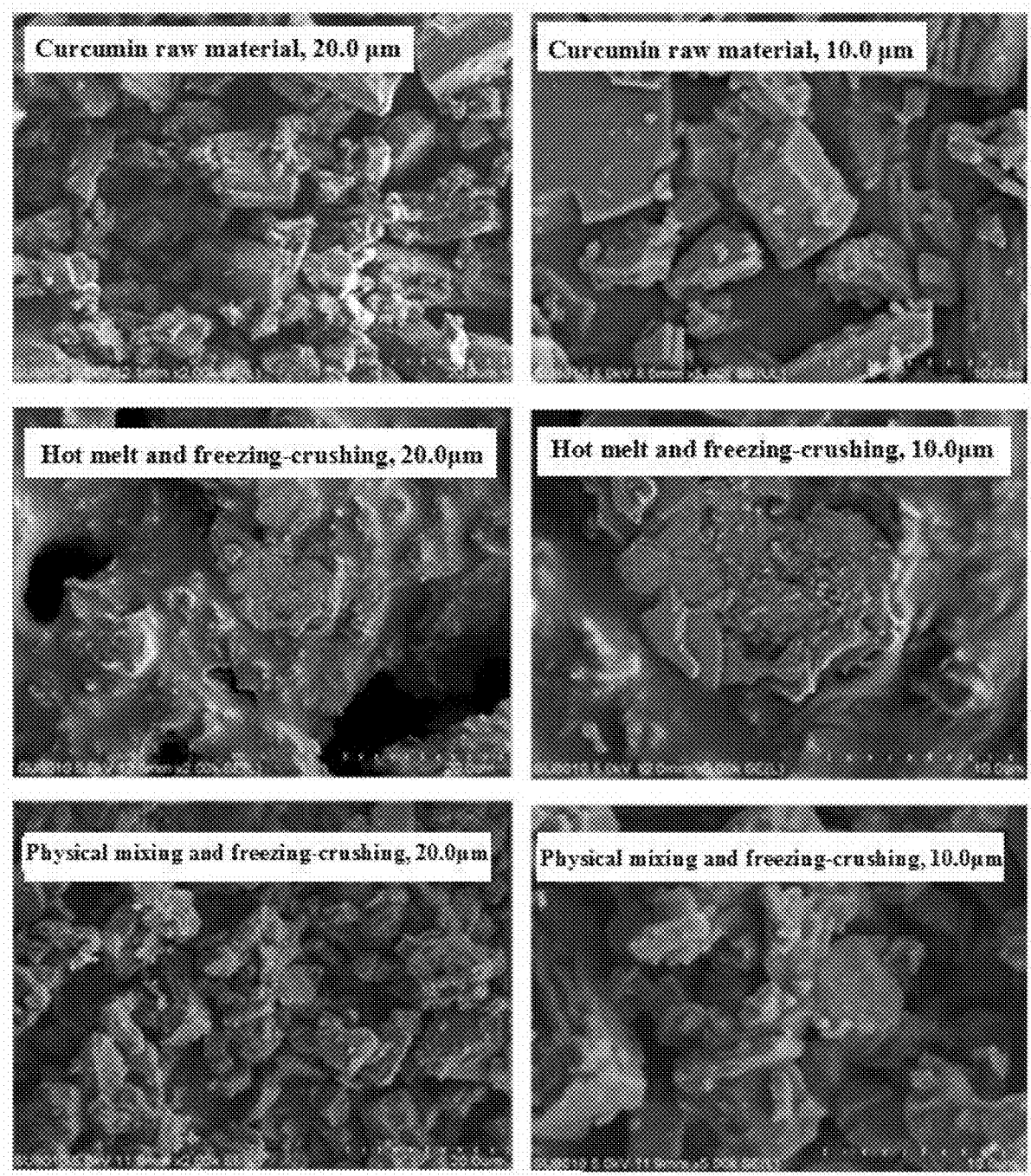
FIG. 2.2

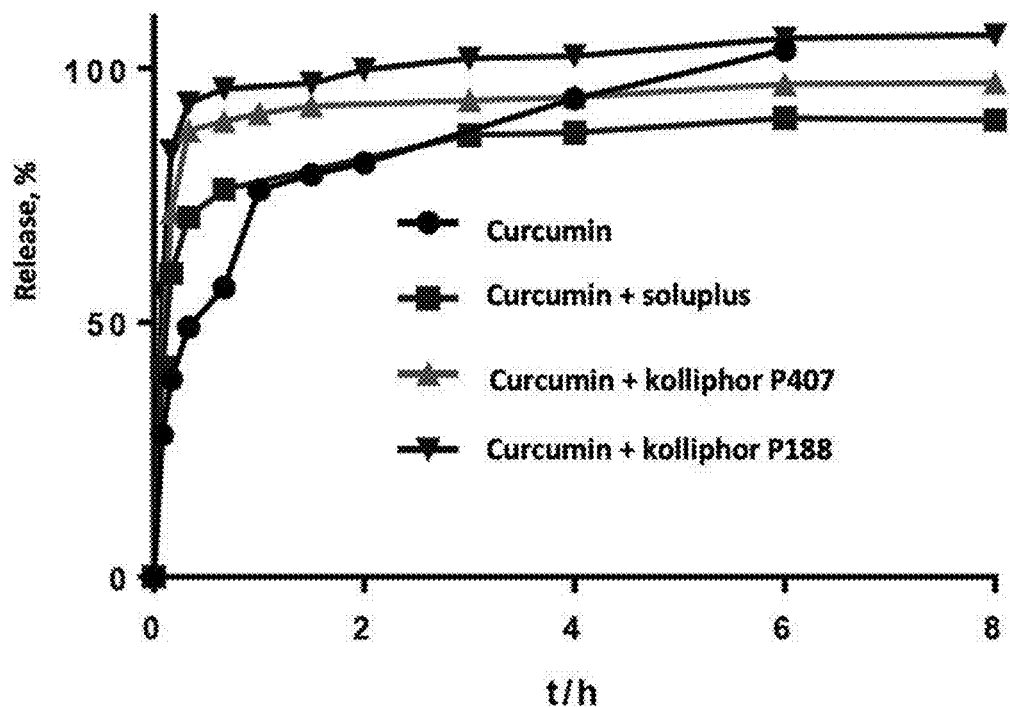
FIG. 3.1
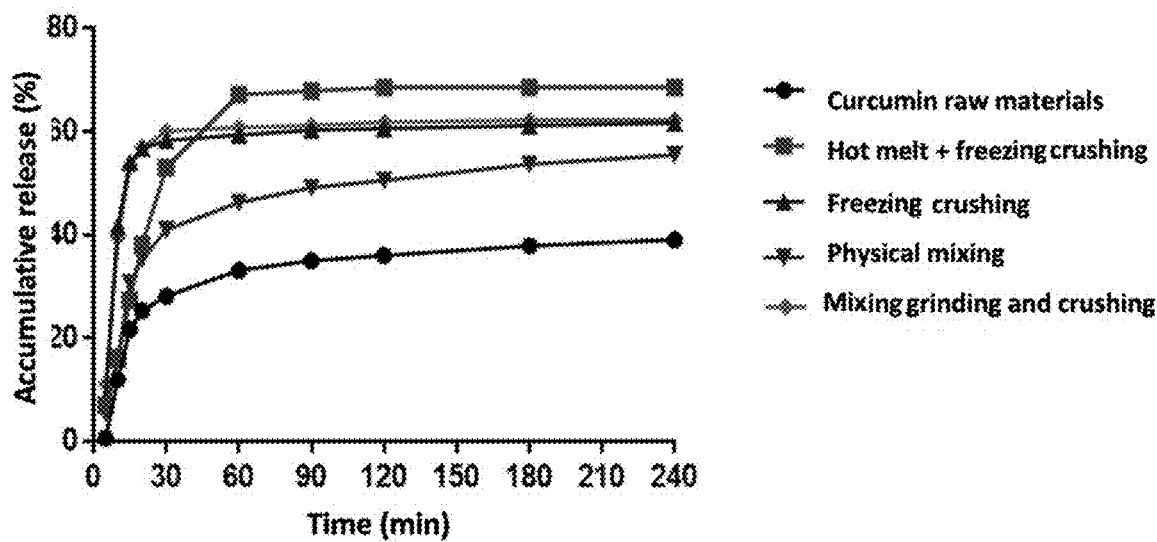
FIG. 3.2

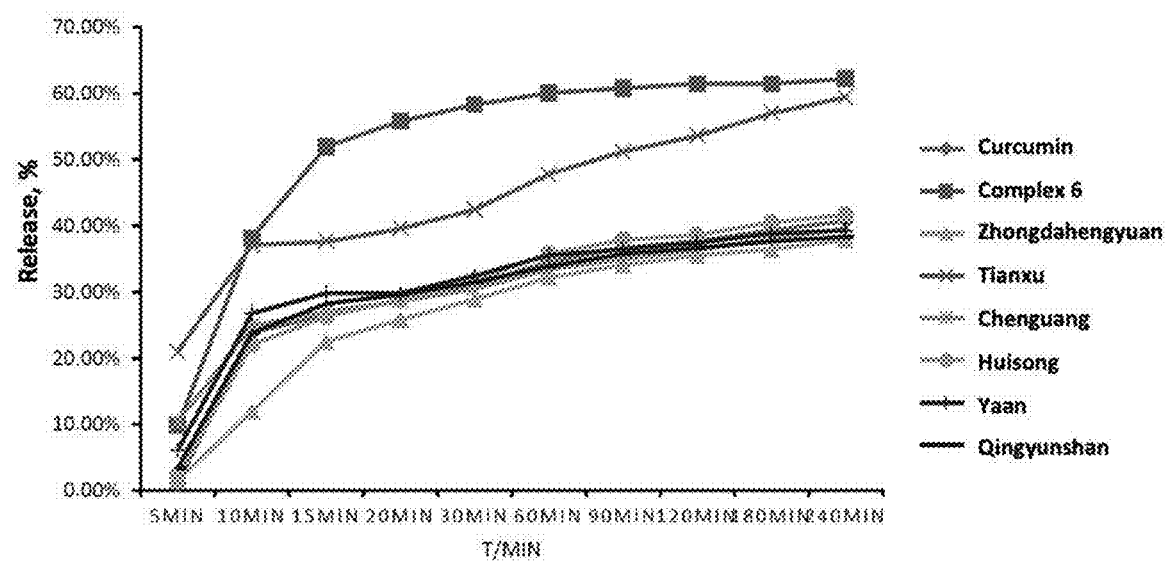
FIG. 3.3
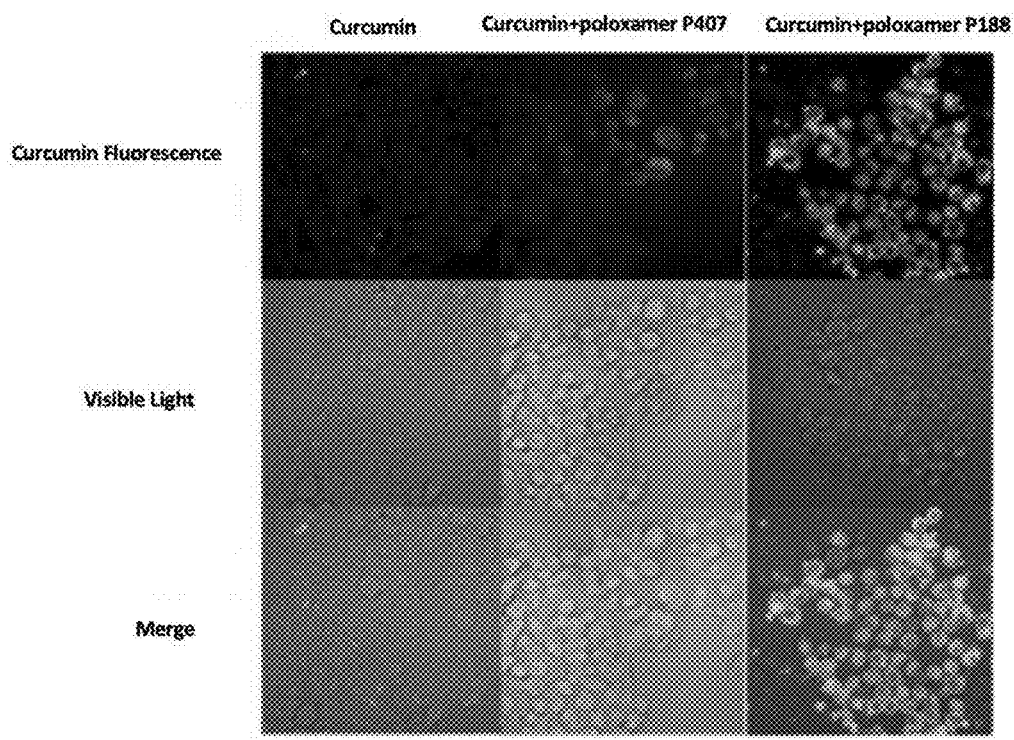
FIG. 4

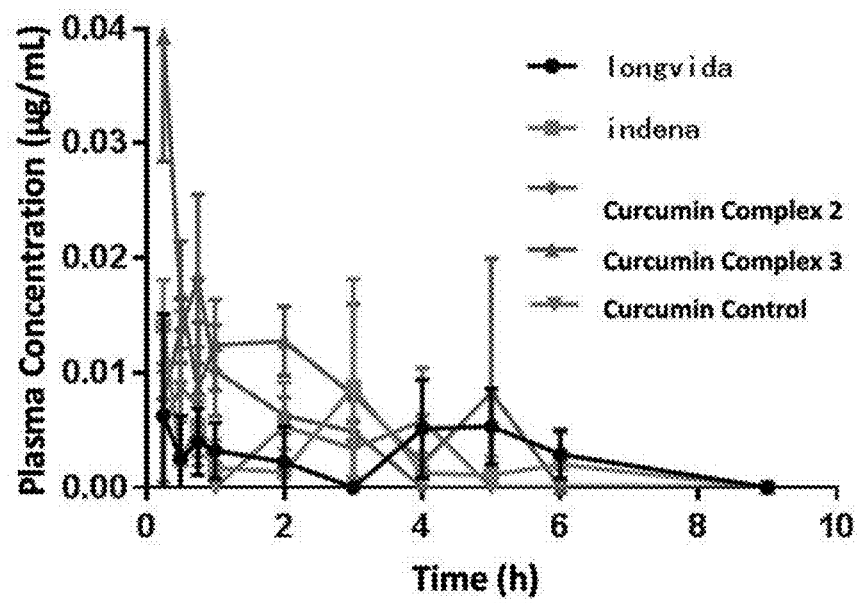
FIG. 5.1
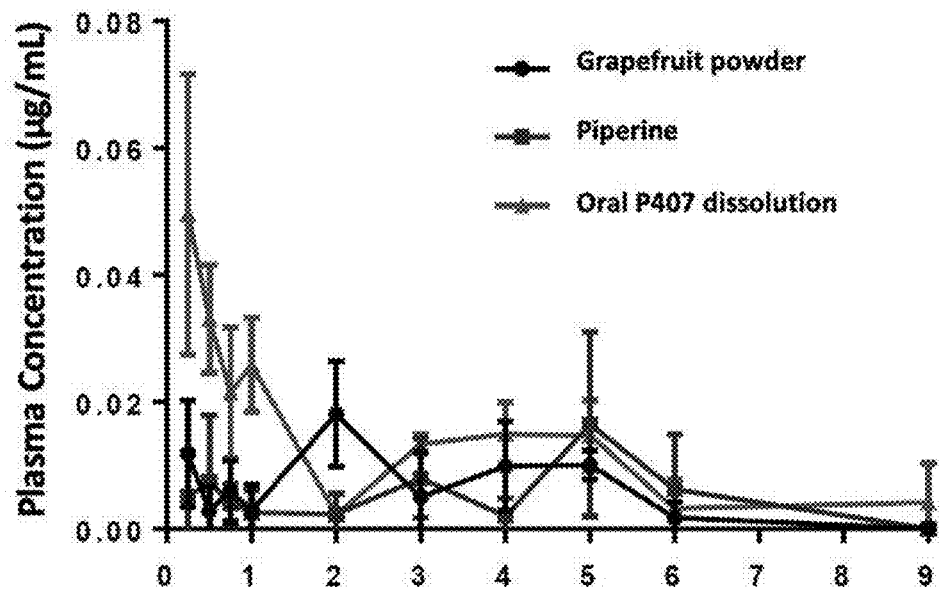
FIG. 5.2

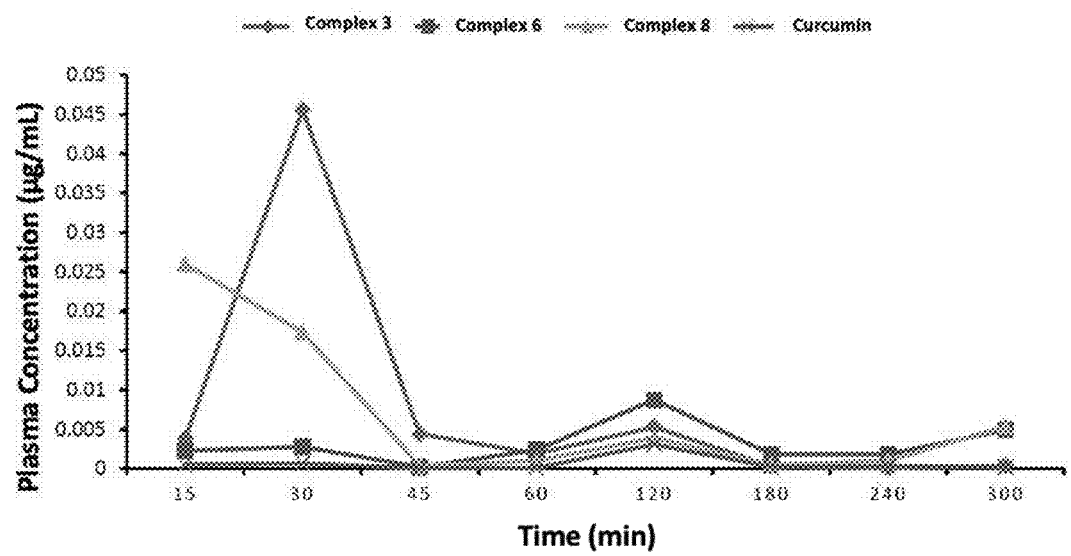
FIG. 5.3
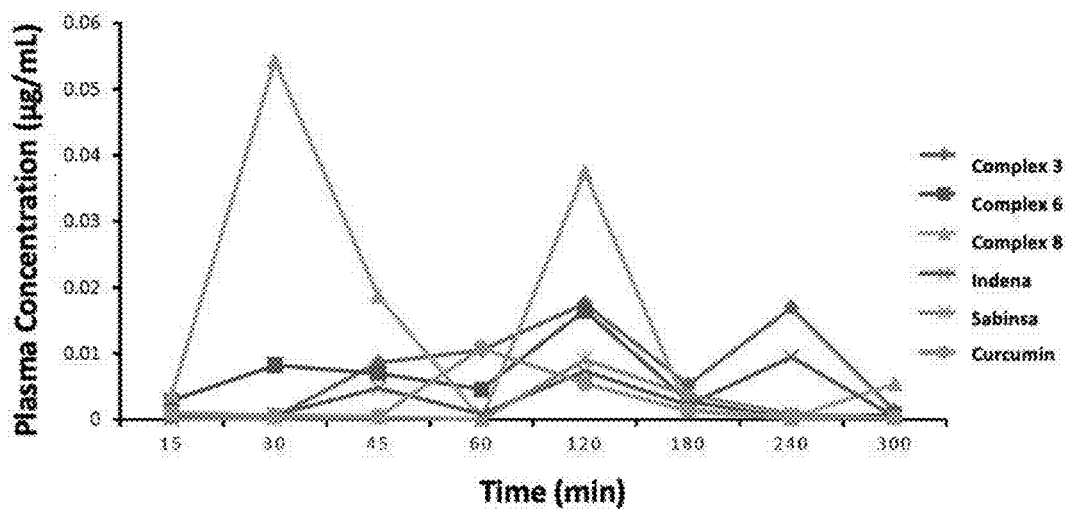
FIG. 5.4

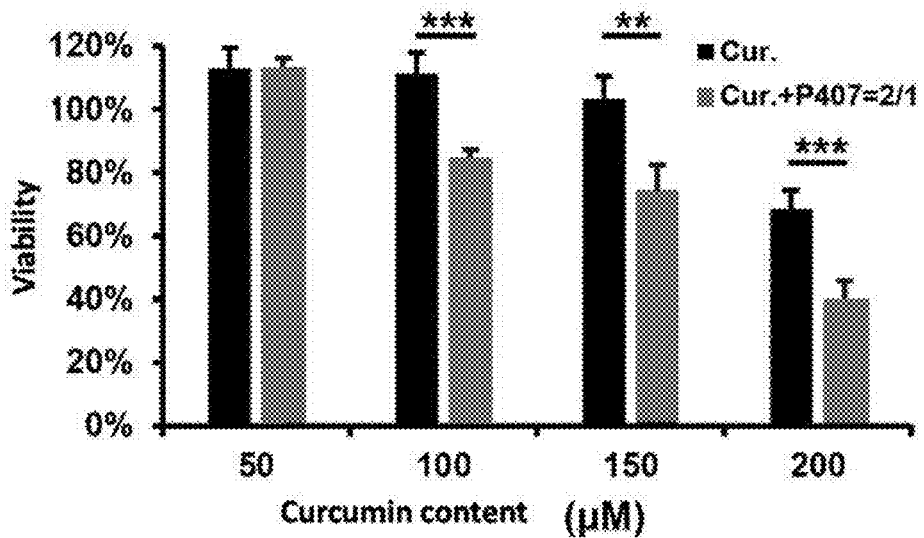
FIG. 6.1
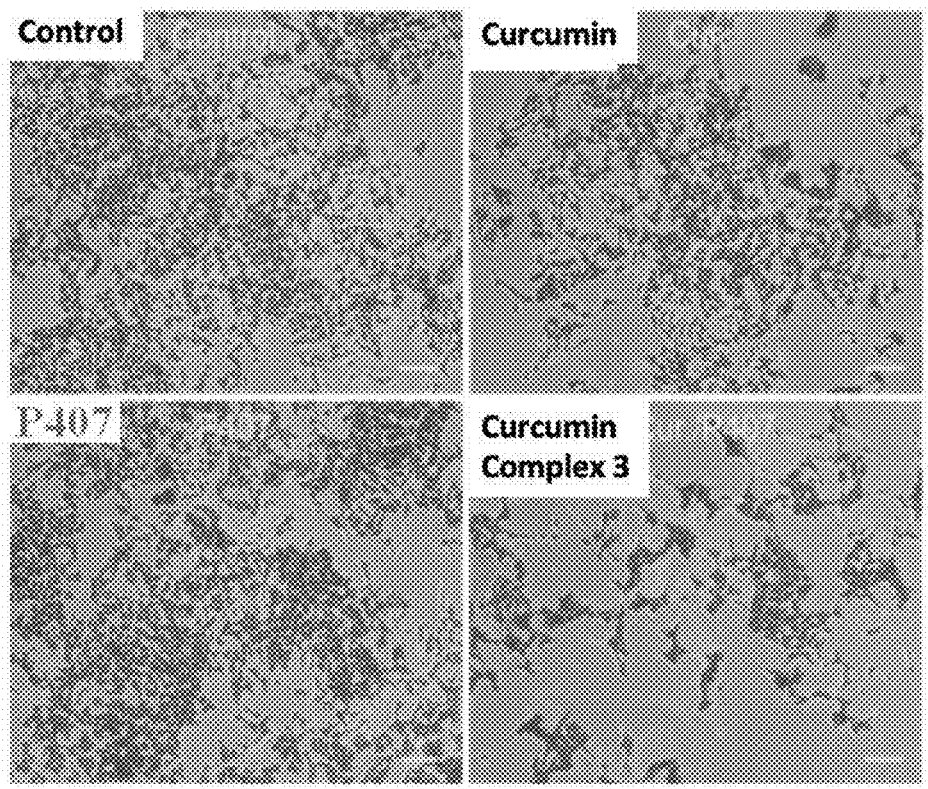
FIG. 6.2

CURCUMIN COMPLEX, PREPARATION METHOD THEREFOR AND DETECTION METHOD THEREFOR

The present application is the national phase of International Application No. PCT/CN2020/139359, titled "CURCUMIN COMPLEX, PREPARATION METHOD THEREFOR AND DETECTION METHOD THEREFOR", which claims the priority to Chinese Patent Application No. 202010055763.1, titled "CURCUMIN COMPLEX, PREPARATION METHOD THEREFOR AND DETECTION METHOD THEREFOR", filed on Dec. 25, 2020 with the Chinese Patent Office. The entire disclosures thereof are incorporated herein by reference.

FIELD

The present invention relates to the field of pharmaceutical preparations, in particular to a curcumin complex with improved curcumin bioavailability, and a preparation method and detection method thereof.

BACKGROUND

Curcumin (Cur) also known as acidic yellow, is a polyphenol natural antioxidant extracted from tuber of Curcuma plants such as Curcuma longa, Curcuma zedoary, Curcuma aromatica, etc. Curcumin is a diketone compound having an appearance of orange crystalline powder, and it is a food additive such as natural food coloring and seasoning widely used in China and abroad. Meanwhile, it has many pharmacological activities including anti-inflammatory, antioxidant, anti-tumor, myocardial protection, anti-fibrosis, hypolipidemic and anti-atherosclerosis, and is listed as the third-generation anti-cancer chemopreventive agent by the National Cancer Institute.

Current commercial products of curcumin mainly include curcumin capsules and curcumin tablets. In recent years, the market demand and industry prices of curcumin in China and abroad have shown an overall upward trend. However, curcumin has a low water solubility (11 ng/mL, 25° C.), and is unstable (in the presence of light, heat, strong acids and bases, and certain metal ions), and may be affected by the phase I metabolic enzyme CYP450 in the intestinal mucosal cells or the intestinal uridine diphosphate glucuronyl transferase (UGTs), and drug efflux protein-P glycoprotein, leading to poor bioavailability in the body after oral administration, which severely restricts its further development and promotion.

At present, most of the existing patents or literature reports focus on solid dispersion and inclusion technology, although they can improve the absorption of drugs, there are still certain problems, such as the use of poloxamer and other excipients through solid dispersion technology to prepare curcumin preparations. Due to the requirements of the solid dispersion formula and process, the amount of excipients in the product is large, and the solid dispersion prepared by hot melt or organic solvent evaporation, etc., often involves heating in the process, which may cause certain damage to the drug. Especially as a solid dispersion, it is often faced with the stability problem of the product after long-term storage, that is, curcumin is easy to crystallize out, resulting in a decrease in dissolution.

Therefore, there is an urgent need to develop a curcumin complex that has high bioavailability, simple formulation technology, low cost, and is convenient for large-scale production.

SUMMARY

The purpose of the present invention is to provide a curcumin complex with a simple and stable production process and a preparation method thereof, which greatly improves the bioavailability of curcumin.

Another purpose of the present invention is to provide a method for detecting the content of curcumin content in a curcumin complex.

The technical solutions adopted by the present invention are as follows:

A curcumin complex, wherein the curcumin complex comprising a solid complex formed by grinding excipients and curcumin;

wherein, the excipients comprise Soluplus, poloxamer 407, or poloxamer 188;

when the excipients comprise Soluplus, the mass ratio of curcumin to Soluplus is 1:8-10; and when the excipients comprise poloxamer 407 or poloxamer 188, the mass ratio of curcumin to poloxamer 407 is 1:0.4-0.6, or the mass ratio of curcumin to poloxamer 188 is 1:0.4-0.6.

wherein, Soluplus is a graft copolymer of polyethylene caprolactam-polyvinyl acetate-polyethylene glycol, which is a new type of amphiphilic non-ionic pharmaceutical polymer material. It is a white to slightly yellow free-flowing powder, almost odorless, with a glass transition temperature (Tg) of about 70° C. Soluplus is highly safe, has the functions of solubilization, crystal suppression, spatial stability, suspension, heat sensitivity, film formation, etc., and has shown good application prospects in improving the dissolution rate and bioavailability of poorly soluble drugs. Soluplus is suitable for physical mixing, melt granulation, spray drying, hot melt extrusion, solution, liquid suspension, lipid drug delivery system, transdermal patch, film-forming agent, and other process technologies.

The average molecular weight of Kolliphor P407 is 9,800-14,600. It is a block copolymer of polyoxyethylene (70%, w/w) and polyoxypropylene. It is a rough white powder, tasteless and odorless, with an HLB value of 22, and has a good solubilization effect on poorly soluble substances. It is suitable for physical mixing, melt granulation, spray drying, hot melt extrusion, solution, liquid suspension, lipid drug delivery system, gel, soft capsule filling and many other process technologies.

Kolliphor P188 is also known as poloxamer 188, with an average molecular weight of 7,680-9,510. It is a block copolymer of polyoxyethylene (80%, w/w) and polyoxypropylene, with an HLB value of 29. In liquid oral, topical and injection preparations, it is used as an emulsifier, solubilizer or suspension stabilizer, and in solid preparations it is used as a plasticizer and bioavailability promoter. Kolliphor P188 is suitable for physical mixing, melt granulation, spray drying, hot melt extrusion, solutions, liquid suspensions, lipid drug delivery systems, emulsions and creams, ointments, foams, gels, transdermal patches, external film, soft capsule filling and many other technology.

Preferably, the excipients further comprise grapefruit powder or piperine.

Preferably, the excipients consist of grapefruit powder and poloxamer 407; alternatively, the excipients consist of grapefruit powder and poloxamer 188.

More preferably, the mass ratio of curcumin, grapefruit powder, and poloxamer 407 is 1:0.9-1.1:0.4-0.6.

The present invention also provides a method of preparing the above curcumin complex, comprising the following steps: mixing curcumin and excipients, placing them in a grinder for 0.5-30 minutes to make them fully contacted.

Preferably, the above method of preparing the curcumin complex comprises the following steps: crushing curcumin to a particle size of 10-30 μm; airflow crushing the excipients to 20-50 μm; mixing the crushed curcumin and excipients, placing them in a grinder and grinding for 0.5-30 min to make them fully contacted.

In the present invention, curcumin is pulverized into 10 to 30 μm, and poloxamer is pulverized into 20 to 50 μm by airflow, so that the difference in particle size between the two is not significant. After mixing, they are placed in a grinder for low-temperature grinding, so that the two are in full contact, thus the surface activity of poloxamer can reduce the surface static electricity of curcumin, which is conducive to maintaining the stability of the mixture. Thus, the present invention avoids the delamination of the mixture material by controlling the particle size after pulverization and mixing and grinding (reducing the surface static electricity of curcumin and enhancing the interaction with poloxamer). In addition, the close combination of poloxamer and curcumin also helps to play the role of poloxamer in improving the solubility and dissolution of curcumin.

The specific processes of grinding in a grinder are as follows: performing grinding twice at a frequency of 20-80 Hz, with each grinding time of 0.5-3 minutes, and an interval between two grindings of 5-15 seconds.

The curcumin complex of the present invention can also be obtained by freeze-drying, and the specific steps are as follows: mixing curcumin and the excipients and then crushing the mixture with a freezing crusher.

In the present invention, curcumin and the excipients are mixed in proportions and crushed by a freezing crusher. Crushing the particle size of the curcumin raw material to 0.1-15 μm not only increases the bioavailability of curcumin by reducing the particle size of curcumin itself, but also further improves the dissolution and bioavailability of curcumin through the close combination with poloxamer.

Preferably, the preparation method of the curcumin complex comprises the following steps: heating the excipients to a molten state in a water bath, then adding curcumin in portions, stirring evenly, freezing and crushing.

The heating temperature of the water bath is 60-80° C., the stirring speed is 100-300 rpm, and the stirring time is 60-80 min.

The specific process of crushing with a freezing crusher is: performing freezing-crushing at a temperature of −125 to −115° C., with feeding speed of 28-32 rpm, crushing speed of 3800-4000 rpm and fan speed of 1900-2100 rpm.

The curcumin complex of the present invention can also be obtained by a hot-melt extrusion method, and the specific steps are as follows: mixing curcumin and excipients in proportion, and performing extrusion with a hot-melt extrusion granulator.

The hot-melted poloxamer is coated on the surface of the curcumin raw material, which improves the dissolution and availability of curcumin.

More preferably, the specific process of performing extrusion is: continuous mixing at room temperature for 5-10 minutes, heating at 42-62° C. with a discharging speed of 3 rpm-100 rpm and an extruding hole diameter of 0.50-3.00 mm, and crushing after extrusion.

Combining the previous research experience, using cell and animal models, and the modern analytical techniques, the preparation process of curcumin and the excipients are improved mainly through grinding and crushing (or freezing and crushing) after mixing curcumin and poloxamer, and the oral bioavailability of curcumin is improved. In the research, it was found that if mixing is performed directly without grinding, although the drug absorption can be improved to a certain extent, the mixing-grinding process after optimization of certain technological parameters will significantly improve the in vitro dissolution and in vivo absorption of curcumin.

The present invention also provides a method for detecting the content of curcumin in the curcumin complex, comprising the following steps: preparing the curcumin complex into a test solution, and then performing a detection by HPLC detection method; wherein the conditions for HPLC are: column of Plastisil ODS; size of 150×4.6 nm, 5 μm; detection wavelength of 421 nm; mobile phase of acetonitrile, methanol and water with a volume ratio of 40:12:48, isocratic elution; flow rate of the mobile phase of 1.0 mL/min; column temperature of 25° C.; and injection volume of 20 μL.

The detection method of the present invention is a simple, reproducible, and stable HPLC-UV method for the determination of curcumin in a curcumin extract. This method can simultaneously detect the three peaks corresponding to curcumin, demethoxycurcumin and bisdemethoxycurcumin.

Compared with the prior art, the present invention has the following beneficial effects:

(1) In view of the problems that the heat treatment in the existing processing technology may cause damage to curcumin and the deep-processed products often face the poor stability of the product after long-term storage, and curcumin is easy to crystallize and precipitate, resulting in a decrease in dissolution, the invention provides a simple, stable and process-controllable method, the method specifically adopts excipients with good biocompatibility and curcumin to further improve its bioavailability after mixing and grinding. The method of the present invention has simple formula and technology, the crystal form of curcumin has not changed. Not only the quality control is more complete and reliable, but also the cost is lower and it is convenient for large-scale production.

(2) In view of the problem that most of the curcumin complexes in the prior art are deep-processed products, and their later reprocessing (such as pulverization, mixing and post-processing) are subject to certain restrictions, the invention provides a product that can not only directly face the users, but also can be used in the field of further pharmaceutical preparations, which greatly broadens the application range of the product.

BRIEF DESCRIPTION OF DRAWINGS

FIG. 1 is the photographs of the dispersion of curcumin complexes prepared by different preparation methods in water, in which A is curcumin raw material; B is curcumin complex 3; C is curcumin complex 3a.

FIG. 2.1 is the scanning electron micrographs of the curcumin complexes, in which Cur. represents curcumin.

FIG. 2.2 is the scanning electron micrographs of the curcumin complexes under different processes, in which Cur. represents curcumin.

FIG. 3.1 is the curcumin dissolution profiles of the curcumin complexes.

FIG. 3.2 is the curcumin dissolution profiles of the curcumin complexes under different processes.

FIG. 3.3 is the dissolution profiles of the curcumin complexes from different manufacturers.

FIG. 4 is the fluorescence images of curcumin in the curcumin complexes taken up by Caco-2 cells.

FIG. 5.1 is the rat gavage absorption kinetic curves of curcumin raw materials, different curcumin/poloxamer (P407) complexes and curcumin commercial products.

FIG. 5.2 is the curcumin kinetic curves of the curcumin after the rats were given by gavage after mixing the raw materials of curcumin with grapefruit powder, piperine and P407.

FIG. 5.3 is the rat gavage absorption kinetic curves of curcumin raw materials, and the curcumin complexes under different processes.

FIG. 5.4 is the rat gavage absorption kinetic curves of curcumin raw materials, the curcumin complexes and curcumin commercial products.

FIG. 6.1 shows the cytotoxicity of curcumin raw materials and curcumin complex 3 on tumor cells 4T1.

FIG. 6.2 is the crystal violet staining images of tumor cells 4T1 treated with different curcumin or curcumin complex 3.

DETAILED DESCRIPTION

The embodiments of the present invention will be described in detail below in conjunction with examples, but those skilled in the art will understand that the following examples are only used to illustrate the present invention and should not be regarded as limiting the scope of the present invention. If specific conditions are not indicated in the examples, it shall be carried out in accordance with the conventional conditions, or the conditions recommended by the manufacturer.

The instruments used in the following examples include: electronic balance (AL204, METTLER TOLEDO Shanghai Co., Ltd.), automatic grinder (JXFSTPRP24, Shanghai Jingxin Industrial Development Co., Ltd.), six unit magnetic heating agitator (CJJ-931, Jiangsu Jintan Jincheng Guosheng Experimental Instrument Factory), intelligent dissolution tester (ZRS-8G, Tianda Tianfa Technology Co., Ltd.), desktop air constant temperature oscillating box (THZ-C, Jiangsu Haimen Qilin Medical Instrument Factory), high performance liquid chromatography (Agilent 1260), cold field emission scanning electron microscope (SU-8010, Hitachi Corporation), fluorescence microscope (SW-CJ-EFD, Shanghai Boxun Industrial Co., Ltd.), vortex mixer (XW-80A, Haimen Qilinbeier Instrument Manufacturing Co., Ltd.), Centrifuge (AG22331, Eppendorf), Ultrapure water meter (ResearchUVF, Shanghai Hetai Instrument Co., Ltd.), blast drying oven (DHG-9123A, Shanghai Yiheng Experimental Instrument Co., Ltd.), automatic dissolution apparatus (FADT-801QV, FADT-801RC, Shanghai Fukesi Analytical Instrument Co., Ltd.), high-speed centrifuge (TGL-16B, Shanghai Anting Scientific Instrument Factory), constant speed electric agitator (HJJ-100A, Changzhou Danrui Experimental Instrument and Equipment Co., Ltd.), freezing crusher (BCF-250, Jiangsu Guibao Group Co., Ltd.), Hot melt extruder (ME-D27, Shenzhen Xinyite Technology Co., Ltd.).

Example 1

Preparation of Curcumin Complex 1.1 Source of Material

Curcumin raw materials (95%, JIAHE Phytochem), Soluplus (BASF), Kolliphor P407 (BASF), Kolliphor P188 (BASF), Grapefruit powder (Shanghai OFK trade Co., Ltd, WGF-SD, contains 80% grapefruit juice concentrate powder and 20% maltodextrin), Piperine.

1.2 Preparation of the Sample 1.1.1 Preparation of Curcumin Complex 1

Curcumin and Soluplus were weighed and mixed in a 2 mL test tube for the grinder according to a mass ratio of 1:9.2 small steel beads were added to each tube, shaken well and put into the grinder. Grinding was performed twice at a frequency of 65 Hz, 1 minute each time, with an interval of 10 seconds between the two times. The curcumin complex 1 was obtained.

1.1.2 Preparation of Curcumin Complex 2

Curcumin and Soluplus P188 were weighted and mixed in a 2 mL test tube for the grinder according to a mass ratio of 2:1.2 small steel beads were added to each tube, shaken well and put into the grinder. Grinding was performed twice at a frequency of 65 Hz, 1 minute each time, with an interval of 10 seconds between the two times. The curcumin complex 2 was obtained.

1.1.3 Preparation of Curcumin Complex 3

Curcumin and Kolliphor P407 were weighed and mixed in a 2 mL test tube for the grinder according to a mass ratio of 2:1.2 small steel beads were added to each tube, shaken well and put into the grinder. Grinding was performed twice at a frequency of 65 Hz, 1 minute each time, with an interval of 10 seconds between the two times. The curcumin complex 3 was obtained.

Firstly, curcumin was crushed to a particle size of 10-30 μm, and Kolliphor P407 was subjected to air jet pulverization to a particle size of 20 to 50 μm. They were mixed in a 2 mL test tube for the grinder according to a mass ratio of 2:1.2 small steel beads were added to each tube, shaken well and put into the grinder. Grinding was performed twice at a frequency of 65 Hz, 1 minute each time, with an interval of 10 seconds between the two times. The curcumin complex 3a was obtained.

The curcumin raw materials, the curcumin complex 3 and curcumin complex 3a were dispersed in water respectively, and the photographs of the specific situation are shown in FIG. 1. It can be seen from FIG. 1 that curcumin is insoluble in water, and it is easy to precipitate or aggregate and stick to the wall after being dispersed in water. For the materials, after a short time of mixing and grinding, the dispersibility and dissolution performance were obviously improved, but there was still a small amount of aggregation, the particle size was too large, and the solution was not uniform enough. In contrast, after the materials were pulverized separately, they were mixed and ground, the curcumin was well dispersed, the solution was relatively uniform and stable, and there was no obvious aggregation or precipitation.

1.1.4 Preparation of Curcumin Complex 4

Curcumin, Kolliphor P407 and grapefruit powder were weighed and mixed in a 2 mL test tube for the grinder according to a mass ratio of 2:1:2.2 small steel beads were added to each tube, shaken well and put into the grinder. Grinding was performed twice at a frequency of 65 Hz, 1 minute each time, with an interval of 10 seconds between the two times. The curcumin complex 4 was obtained.

1.1.5 Preparation of Curcumin Complex 5

Curcumin, Kolliphor P407 and piperine were weighed and mixed in a 2 mL test tube for the grinder according to a mass ratio of 10:5:4.2 small steel beads were added to each tube, shaken well and put into the grinder. Grinding was performed twice at a frequency of 65 Hz, 1 minute each time, with an interval of 10 seconds between the two times. The curcumin complex 5 was obtained.

Scanning electron micrographs of curcumin and curcumin complex 1, curcumin complex 2, curcumin complex 3 prepared as described above are shown in FIG. 2.1-2.2

(3000×, the scale represents 10 μm). It can be seen from FIG. 2.1-2.2 that the morphology of curcumin did not change significantly after curcumin was mixed and ground with various excipients.

1.1.6 Preparation of Curcumin Complex 6

Curcumin and Kolliphor P407 were weighed according to mass ratio of 2:1, fully mixed uniformly, put into the freezing crusher, frozen and crushed at a temperature of −120° C. The feed speed was 30 rpm, the crushing speed was 3900 rpm, and the fan speed was 2000 rpm.

1.1.7 Preparation of Curcumin Complex 7

Curcumin and Kolliphor P407 were weighed according to mass ratio of 2:1. Kolliphor P407 was firstly heated in a water bath at 80° C. to a molten state, then curcumin was added in portions and stirred evenly, and froze and crushed at room temperature. Freezing and crushing were performed at a temperature of −120° C., the feed speed was 30 rpm, the crushing speed was 3900 rpm, and the fan speed was 2000 rpm.

1.1.8 Preparation of Curcumin Complex 8

Curcumin and Kolliphor P407 were weighed according to mass ratio of 2:1, fully mixed uniformly, put into the freezing crusher. Mixing was performed continuously at room temperature for 10 minutes, with heating at 50° C., extruding hole diameter 1.00 mm, and rotating speed 3 rpm. After crushing, extrusion was performed.

Example 2

Content Detection by HPLC 1.1 Reagents and Materials

Reagents: methanol (primary chromatographically pure, Tianjin Siyou Fine Chemical Co., Ltd.), acetonitrile (HPLC grade, Merck Lichrosolv), glacial acetic acid (HPLC grade, Aladdin Reagent)

Materials: curcumin raw materials (95%, MAHE Phytochem), curcumin standard (Ding Rui Chemical (Shanghai) Co., Ltd.), Soluplus (BASF), Kolliphor P407 (BASF), Kolliphor P188 (BASF).

1.2 HPLC Method for Detecting Curcumin Content

The conditions for the HPLC are: the column is Plastisil ODS, the size is 150×4.6 nm, 5 μm; the detection wavelength is 421 nm; the mobile phase is acetonitrile, methanol and water (0.3% glacial acetic acid, HPLC grade)=40:12:48, isocratic elution; the flow rate of mobile phase is 1.0 mL/min; the column temperature is 25° C.; and the injection volume is 20 μL.

The preparation method of the reference substance is as follows: the curcumin reference substance was accurately weighed and dissolved in methanol to prepare a stock solution with a concentration of 1 mg/mL, and then diluted with methanol to 500 μg/mL, 250 μg/mL, 125 μg/mL, 62.5 μg/mL, 31.25 μg/mL, 15.625 mL, 7.812 μg/mL, 3.906 μg/mL, 1.953 μg/mL, 0.977 μg/mL, 0.488 μg/mL, 0.244 μg/mL, and 0.122 μg/mL. The sample was injected according to the chromatographic conditions found above, the peak time and peak area were recorded respectively, and the standard curve was drawn with the concentration as the abscissa and the peak area as the ordinate.

The preparation method of the test article is as follows: equal quality excipients Soluplus, Kolliphor P407, Kolliphor P188 and curcumin raw materials were weighed into a 2 mL test tube for the grinder. 2 small steel beads were added to each tube, shake well, put into the grinder. The frequency was 60 Hz, and grinding was performed for 2 minutes. 70 mg of the ground powder was placed in a 10 mL centrifuge tube, 7 mL of ultrapure water was added and shaken in a constant temperature shaking box at 37° C., 100 rpm for 72 hours. The upper liquid was transferred to 13000 rpm high-speed centrifugation, and the supernatant was injected into a high performance liquid chromatograph for analysis. The obtained curcumin content results are shown in Table 1 below.

TABLE 1

The solubility of curcumin in different mixtures

| Excipients | Peak Area | Concentration/(μg/mL) |
|---|---|---|
| Soluplus | 32396.9 | 200.028 |
| Kolliphor P407 | 14438.7 | 88.125 |
| Kolliphor P188 | 4231.7 | 24.522 |

It can be seen from Table 1 that the excipients Soluplus, Kolliphor P407, and Kolliphor P188 can all improve the solubility of curcumin to varying degrees.

Example 3

Dissolution Test In Vitro 1.1 Reagents and Materials
The same as in Example 2.

1.2 Curcumin Dissolution Test Method In Vitro

The HPLC detection conditions and the preparation method of the reference substance are the same as in Example 2.

The preparation method of the test sample is as follows: equal quality of excipients Soluplus, Kolliphor P407, Kolliphor P188 and curcumin raw materials were weighed into a 2 mL test tube for the grinder. 2 small steel beads were added to each tube, shake well, and put into the grinder. The frequency was 60 Hz, and grinding was performed for 2 minutes. The dissolution medium was 900 mL of 0.5% sodium dodecyl sulfate (SDS) solution at 75 rpm. 20 mg of co-grinding mixture of Soluplus, Kolliphor P407, Kolliphor P188 and curcumin, and 10 mg of (curcumin control group) were taken for experiment. At 5 min, 10 min, 20 min, 40 min, 1 h, 1.5 h, 2 h, 3 h, 4 h, 6 h, and 8 h, 3 mL sample was taken at the same position by the sampling needle, equivalent amount of dissolution medium (0.5% SDS) was immediately supplemented at the same temperature. The sample taken out was filtered by 0.22 μm microporous filter membrane and then analyzed by high performance liquid chromatograph.

The test results are as follows: the dissolution test results of ground curcumin raw materials (curcumin control group), Soluplus, Kolliphor P407, Kolliphor P188 and curcumin co-ground mixture are shown in FIG. 3. It can be seen from FIG. 3.1 that at the first 5 sampling points (5 min, 10 min, 20 min, 40 min, and 1 h), the dissolution of curcumin in the Soluplus, Kolliphor P407, and Kolliphor P188 groups was significantly accelerated due to the presence of excipients. The dissolution of curcumin in the Kolliphor P188 group reached more than 80% at 10 min, and more than 90% at 20 min.

Example 4

Dissolution Test In Vitro 1.1 Reagents and Materials
The same as in Example 2.

1.2 Curcumin Dissolution Test Method In Vitro

The HPLC detection conditions and the preparation method of the reference substance are the same as in Example 2.

The preparation method of the test sample is as follows: Curcumin complex 3 (mixing plus grinding plus crushing), curcumin complex 6 (freezing-crushing), and curcumin complex 7 (hot melt and freezing-crushing) prepared in Example 1 and JIAHE curcumin raw materials (control group, 95%, JIAHE Phytochem), as well as a physical mixture of curcumin raw material and poloxamer (without grinding and crushing treatment) were taken, and each 200 mg was packed into No. 0 capsules. The dissolution medium is 900 mL of 0.5% sodium dodecyl sulfate (SDS) solution at 75 rpm. At 5 min, 10 min, 15 min, 20 min, 30 min, 1 h, 1.5 h, 2 h, 3 h, and 4 h, 5 mL sample was taken at the same position by the sampling needle, equivalent amount of dissolution medium (0.5% SDS) was immediately supplemented at the same temperature. The samples taken out was centrifuged at 10000 rpm for 10 min and then analyzed by high performance liquid chromatograph.

The test results are as follows: the results of the dissolution experiment are shown in FIG. 3.2. It can be seen from FIG. 3.2 that the results of the comparison of different processes are as follows:

(1) Physically mixing curcumin and poloxamer (P407) without grinding and pulverizing, compared with the curcumin raw material, although the dissolution rate can be improved, the degree of improvement is still not ideal.

(2) With reference to the solid dispersion technology, curcumin and poloxamer (P407) were heated, melted and mixed, and then frozen and crushed, its ability to improve dissolution was further enhanced, especially the accumulated release after 1 hour in vitro, which was the highest in all the groups, but its short-term (within 1 hour) release was still relatively low, and the release within 30-60 minutes is currently an important parameter for evaluating the oral absorption of solid preparations.

(3) In contrast, the process of grinding and pulverizing after physical mixing or the process of freezing and pulverizing after physical mixing has a relatively high release rate and quickly reaches the release curve platform within 20-30 minutes, which will help the absorption of curcumin in the body after oral administration. Therefore, the present invention adopts a mixed grinding and crushing process or a mixed freezing and crushing process to process the mixture of curcumin and poloxamer to improve the in vitro dissolution and in vivo absorption of curcumin.

Example 5

Dissolution Test In Vitro 1.1 Reagents and Materials
The same as in Example 2.
1.2 Curcumin Dissolution Test Method In Vitro The HPLC detection conditions and the preparation method of the reference substance are the same as in Example 2.

The preparation method of the test sample is as follows: Curcumin complex 6 prepared in Example 1, and JIAHE curcumin raw material (95%, JIAHE Phytochem), Sabinsha curcumin raw material, Indena curcumin raw material, Zhongda Hengyuan curcumin raw material, Hebei Tianxu curcumin raw material, Chenguang curcumin raw material, Huisong curcumin raw material, Ya'an curcumin raw material, as well as Qingyunshan curcumin raw material were taken, and each 200 mg was packed into No. 0 capsules.

The detection method is the same as in Example 4.

The test results are as follows: the results of the dissolution experiment are shown in FIG. 3.3. It can be seen from FIG. 3.3 that at the first 5 sampling points (5 min, 10 min, 15 min, 20 min, and 30 min), the dissolutions of curcumin in complex 6 were significantly accelerated due to the presence of excipients, and the dissolution of curcumin reached the high melting point at 30 min. After 1 h, it was the plateau period, and the dissolution trend was obviously better than the curcumin raw materials of various manufacturers.

Example 6

Cell Experiment 1.1 Instruments and Consumables
Instruments: incubator, confocal dish, confocal microscope
Consumables: Caco-2 cells, HT-29 cells, and Raji-B cells, DMEM high glucose medium, RPIM1640 medium, EDTA-trypsin, and PBS.
1.2 Cell Culture Caco-2 cells were cultured in DMEM high glucose culture medium (containing 10% fetal bovine serum, 1% penicillin-streptomycin mixed solution, 1% non-essential amino acids), placed in an incubator at 37° C. and 5% $CO_2$. The medium was replaced every two days, digested with 0.25% EDTA-trypsin when it grew to more than 80% confluence, and the cells were passaged at 1:3. HT-29 cells and Raji-B cells were cultured in RPIM1640 culture medium (containing 10% fetal bovine serum, 1% penicillin-streptomycin mixed solution) and incubated in an incubator at 37° C. and 5% $CO_2$, and the medium was replaced every two days. The cells were passaged at 1:5 when it grew to more than 80% confluence.
1.3 Cellular Uptake
1.3.1 Experiment Grouping Curcumin raw material group, curcumin: Kolliphor P407 (2:1) group (complex 3 in Example 1), curcumin: Kolliphor P188 (2:1) group (complex 2 in Example 1).
1.3.2 Experiment Methods Caco-2 cells in the logarithmic growth phase were seeded in a confocal dish at a density of $4 \times 10^4$ cells/mL. The medium was replaced every other day in the first week, and the medium was replaced every day from the second week. After culturing for 14 days at 37° C. and 5% $CO_2$, the culture medium was removed, and the drug-containing serum-free medium (curcumin concentration 20 μg/mL) was used to incubate for 4 hours. The drug-containing culture medium was removed under dark conditions, washed with PBS for three times, and the fluorescence intensity of intracellular curcumin of different groups was observed under a confocal microscope and photographed. The stronger the fluorescence, the more the uptake.
1.3.3 Experiment Results The results of the experiment are shown in the confocal micrograph (60×) of FIG. 4. It can be seen from FIG. 4 that compared with the curcumin control group, the green fluorescence of the curcumin: Kolliphor P188 (2:1) group was significantly enhanced, indicating that Kolliphor P188 has a better effect of promoting curcumin uptake.

1.4 Study on the Mechanism of Cell Uptake and Cell Entry

A highly sensitive flow cytometer was used to measure the fluorescence value of curcumin to quantitatively calculate the cellular uptake rate of the drug.

1.4.1 Experiment Grouping

Blank group, curcumin group, curcumin complex 3 group, curcumin complex 2 group, verapamil group, sodium azide group, ketoconazole group.

1.4.2 Experiment Methods

Using a three-cell model: Caco-2 cells and HT-29 cells in logarithmic growth phase were seeded in 6-well plates at a density of $7\times10^4$ cells/mL and $3\times10^4$ cells/mL, respectively. The culture medium was replaced every other day in the first week, and the culture medium was replaced every day for 14 days from the second week. Raji-B cells in the logarithmic growth phase were used to inoculate them at a density of $1\times10^4$ cells/mL on the last 3 days. After 14 days, the culture medium was removed, the inhibitor was added. Half an hour later the drug-containing preparations (curcumin group concentration was 20 μg/mL, verapamil concentration was 300 μg/mL, sodium azide concentration was 1 mg/mL, and ketoconazole concentration was 10 μg/mL) serum-free culture medium was incubated for 4 hours. The drug-containing culture medium was removed under dark conditions, washed with PBS three times, after digested with 0.25% EDTA-trypsin, serum-containing culture medium was added to terminate the digestion. Centrifugation was performed at 1200 rpm for 5 min. Washing with PBS was performed twice, resuspending and sieving were performed then. Using the auto-fluorescence characteristic of curcumin, the cell uptake rate of curcumin was quantitatively determined in a flow cytometer (488 nm excitation, blue light, FL1, 530±15 nm, FITC/GFP).

1.4.3 Experimental Results

Verapamil is a p-protein inhibitor. Compared with the curcumin control group, the verapamil-treated group had a 2-fold increase in the uptake of curcumin by cells, which proves that the absorption of curcumin is affected by the efflux of p-glycoprotein. Sodium azide is a commonly used energy-dependent transport inhibitor (active transport inhibitor, endocytosis inhibitor, etc.). The uptake of curcumin by cells in the sodium azide group was increased by more than one fold, proving that curcumin may be imported into cells through active transport. Ketoconazole is a commonly used specific inhibitor of CYP3A4. The uptake of curcumin by cells in the ketoconazole group was increased by more than five folds, proving that one of the reasons for the poor absorption of free curcumin is that it is affected by the phase I metabolic enzyme CYP3A4. Compared with the curcumin grinding control group, the Kolliphor P407 and Kolliphor P188 group cells had increased the uptake of curcumin, and the Kolliphor P188 group had an uptake increased by near two folds, see Table 2 below.

TABLE 2

Preliminary screening of the intake of curcumin cells

| groups | average value |
|---|---|
| Blank | 8.9 |
| Curcumin raw material | 19.4 |
| Curcumin complex 3 | 22 |
| Curcumin complex 2 | 52.38 |
| Curcumin + verapamil | 59.52 |
| Curcumin + sodium azide | 48.73 |
| Curcumin + ketoconazole | 125.58 |

Example 7

Animal Experiment 1.1 Experimental Animals

SD (Sprague-Dawley) rats, male, 200 g, purchased from Shanghai Slack Laboratory Animal Co., Ltd.

1.2 Dosing and Grouping

Gavage administration: the curcumin complex 2 and curcumin complex 3 prepared in Example 1 were used for gavage administration, which are knowns as curcumin complex 2 group (P188 group) and curcumin complex 3 group (P407 group); also includes the curcumin raw material group, the commercially available curcumin raw materials Longvida group and the Indena group, and the dose of gavage administration was 50 mg/kg.

1.3 Blood Samples Handling

Time points of blood collection: 15 min, 30 min, 45 min, 1 h, 2 h, 3 h, 4 h, and 5 h.

Methods of taking blood and processing blood samples: blood was collected from the orbit of the rats and blood samples were collected with heparinized 1.5 mL EP tubes (Preparation method: an appropriate amount of heparin sodium was dissolved in ultrapure water to prepare a 1% heparin sodium solution, 0.1 mL was taken into a 1.5 mL EP tube and infiltrated the inner wall evenly, and put in an oven to dry for later use). Blood was collected, 0.5 mL for each tube. Centrifugation was performed at 2000 rpm for 5 min, 150 μL of the upper plasma was taken, 100 μL of nitrendipine ethyl acetate solution (250 μg/mL) was added, then 1 mL ethyl acetate was added, vortexed and mixed for 2 minutes. Centrifugation was performed at 12000 rpm for 5 minutes. The supernatant was taken, after the ethyl acetate was blown dry, reconstituted with 100 μL methanol, vortexed for 30 seconds, and measured by high performance liquid chromatography (sample injection volume: 20 μL). The standard curve solution was treated in the same way.

1.4 Experimental Results

The experimental results are shown in FIG. 5.1 and Table 3 and Table 4. It can be seen from the results that the commercially available products did not show a significant improvement, and the bioavailability of curcumin complex 3 was significantly better than that of the commercially available curcumin raw material, indicating that the bioavailability of curcumin raw materials had been improved.

TABLE 3

In vivo pharmacokinetic parameters of rats with different curcumin preparations after gavage administration (AUC)

| groups | Longvida | Indena | Curcumin complex 2 | Curcumin complex 3 | Curcumin control |
|---|---|---|---|---|---|
| baseline | 0 | 0 | 0 | 0 | 0 |
| AUC | 0.02285 | 0.02126 | 0.02643 | 0.05026 | 0.01919 |

TABLE 4

In vivo pharmacokinetic parameters of rats with different curcumin preparations after gavage administration (Relative bioavailability)

| groups | Longvida | Indena | Curcumin complex 2 | Curcumin complex 3 |
|---|---|---|---|---|
| relative bioavailability (%) | 119.07 | 110.79 | 137.73 | 261.91 |

Example 8

Animal Experiment 1.1 Experimental Animals

SD (Sprague-Dawley) rats, male, 200 g, purchased from Shanghai Slack Laboratory Animal Co., Ltd.

1.2 Dosing and Grouping

Gavage administration: the curcumin complex 4 and curcumin complex 5 prepared in Example 1 were used for gavage administration, which are knowns as the grapefruit powder group and the piperine group; in addition, curcumin complex 3 was dissolved in ethanol and ethanol was removed by rotary evaporation. The preparation was known as the oral 407 dissolution group, and the dosage of gavage administration was 50 mg/kg.

1.3 Blood Samples Handling

The same as in Example 7.

1.4 Experimental Results

The experimental results are shown in FIG. 5.2 and Table 5. It can be seen from the results that curcumin complex 4 and curcumin complex 5 can inhibit metabolism, and when used in combination with curcumin, the bioavailability of curcumin was further improved.

TABLE 5

In vivo pharmacokinetic parameters of rats after curcumin mixed with grapefruit powder, piperine, and P407 (AUC)

| groups | Oral 407 dissolution group | Grapefruit powder group | Piperine group |
|---|---|---|---|
| baseline | 0 | 0 | 0 |
| AUC | 0.1007 | 0.05223 | 0.04644 |

Example 9

Animal Experiment 1.1 Experimental Animals

SD (Sprague-Dawley) rats, male, 200 g, purchased from Beijing Vital River Laboratory Animal Technology Co., Ltd.

1.2 Dosing and Grouping

Gavage administration: the curcumin complex 3, curcumin complex 6, curcumin complex 8, and JIAHE curcumin raw material (control, 95%, JIAHE Phytochem) prepared in Example 1 were used for gavage administration.

1.3 Blood Samples Handling

The same as in Example 7.

1.4 Experimental Results

The experimental results are shown in FIG. 5.3 and Table 6 and Table 7. It can be seen from the results that curcumin complex 3, curcumin complex 6, and curcumin complex 8, bioavailability was significantly better than that of curcumin raw material, indicating that the bioavailability of curcumin raw material had been improved.

TABLE 6

In vivo pharmacokinetic parameters of curcumin preparations of different processes in rats after gavage administration (AUC)

| groups | Curcumin complex 3 | Curcumin complex 6 | Curcumin complex 8 | Curcumin control |
|---|---|---|---|---|
| baseline | 0 | 0 | 0 | 0 |
| AUC | 1.0435 | 0.9945 | 1.0669 | 0.2017 |

TABLE 7

In vivo pharmacokinetic parameters of curcumin preparations of different processes in rats after gavage administration (Relative bioavailability)

| groups | Curcumin complex 3 | Curcumin complex 6 | Curcumin complex 8 | Curcumin control |
|---|---|---|---|---|
| baseline | 0 | 0 | 0 | 0 |
| relative bioavailability (%) | 517.35 | 493.06 | 528.95 | |

Example 10

Animal Experiment 1.1 Experimental Animals

SD (Sprague-Dawley) rats, male, 200 g, purchased from Beijing Vital River Laboratory Animal Technology Co., Ltd.

1.2 Dosing and Grouping

Gavage administration: the curcumin complex 3, curcumin complex 6, curcumin complex 8, Sabinsa, Indena, and Jiahe curcumin raw materials (control, 95%, JIAHE Phytochem) prepared in Example 1 are used for gavage administration, and the dosage of gavage administration is 50 mg/kg.

1.3 Blood Samples Handling

The same as in Example 7.

1.4 Experimental Results

The experimental results are shown in FIG. 5.4 and Table 8 and Table 9. It can be seen from the results that the commercial product (control) did not show a significant improvement, and the bioavailability of curcumin complex 3 was significantly better than that of the commercial product (control), indicating that the bioavailability of the curcumin raw material had been improved.

TABLE 8

In vivo kinetic parameters of curcumin raw materials, curcumin complexes and curcumin commercial products (AUC)

| groups | Curcumin complex 3 | Curcumin complex 6 | Curcumin complex 8 | Sabinsa | Indena | Curcumin control |
|---|---|---|---|---|---|---|
| baseline | 0 | 0 | 0 | 0 | | 0 |
| AUC | 2.6985 | 1.4897 | 3.0444 | 0.7825 | 1.1087 | 0.7994 |

TABLE 9

In vivo kinetic parameters of curcumin raw materials, curcumin complexes and curcumin commercial products (Relative bioavailability)

| groups | Curcumin complex 3 | Curcumin complex 6 | Curcumin complex 8 | Sabinsa | Indena | Curcumin control |
|---|---|---|---|---|---|---|
| baseline relative bioavailability (%) | 0 337.57 | 0 186.35 | 0 380.84 | 0 97.89 | 138.69 | 0 |

Example 11

Cellular Drug Efficacy Test

The anti-tumor activity of curcumin and its curcumin complex 3 was investigated, and the CCK8 and crystal violet experiments were used to study the tumor cytotoxicity of curcumin (Cur.) and curcumin/poloxamer 407 Cur./P407 (2:1). As shown in FIG. 6.1, in the concentration range of 100-200 μM, Cur./P407 (2:1) had a higher killing effect on breast cancer cell 4T1 than Cur. alone.

Further crystal violet dying experiment was carried out, as shown in FIG. 6.2, it visually showed the stronger toxicity of Cur./P407 (2:1) to 4T1 at a concentration of 200 μM, and the safety when used as a single excipient (P407).

The invention claimed is:

1. A curcumin complex, wherein the curcumin complex comprises a solid complex formed by grinding excipients and curcumin;
    wherein, the excipients comprise Soluplus, poloxamer 407, or poloxamer 188;
    when the excipients comprise Soluplus, the mass ratio of curcumin to Soluplus is 1:8-10; and
    when the excipients comprise poloxamer 407 or poloxamer 188, the mass ratio of curcumin to poloxamer 407 is 1:0.4-0.6, or the mass ratio of curcumin to poloxamer 188 is 1:0.4-0.6.

2. The curcumin complex according to claim 1, wherein the excipients further comprise grapefruit powder or piperine.

3. The curcumin complex according to claim 1, wherein the excipients consist of grapefruit powder and poloxamer 407.

4. The curcumin complex according to claim 3, wherein the mass ratio of curcumin, grapefruit powder, and poloxamer 407 is 1:0.9-1.1:0.4-0.6.

5. The curcumin complex according to claim 1, wherein the excipients consist of grapefruit powder and poloxamer 188.

6. A method of preparing the curcumin complex according to claim 1, comprising the following steps: mixing curcumin and excipients, placing them in a grinder and grinding for 0.5-30 min to make them fully contacted.

7. A method of preparing the curcumin complex according to claim 1, comprising the following steps: crushing curcumin to a particle size of 10-30 μm; airflow crushing the excipients to 20-50 μm; mixing the crushed curcumin and excipients, placing them in a grinder and grinding for 0.5-30 min to make them fully contacted.

8. The method of preparing the curcumin complex according to claim 6, wherein the specific process of grinding in a grinder is: performing grinding twice at a frequency of 20-80 Hz, with each grinding time of 0.5-3 minutes, and an interval between two grindings of 5-15 seconds.

9. The method of preparing the curcumin complex according to claim 1, comprising the following steps: mixing curcumin and excipients and then crushing them with a freezing crusher.

10. A method of detecting content of curcumin in the curcumin complex according to claim 1, comprising the following steps:
    preparing the curcumin complex into a test solution, and then performing a detection by HPLC detection method;
    wherein the conditions for HPLC are: column of Plastisil ODS; size of 150×4.6 nm, 5 μm; detection wavelength of 421 nm; mobile phase of acetonitrile, methanol and water with a volume ratio of 40:12:48, isocratic elution; flow rate of the mobile phase of 1.0 mL/min; column temperature of 25° C.; and injection volume of 20 μL.

* * * * *